(12) United States Patent
Blomqvist et al.

(10) Patent No.: US 8,681,725 B2
(45) Date of Patent: Mar. 25, 2014

(54) SYSTEM IMPOSED THROTTLED TRANSMISSION

(75) Inventors: Elias Blomqvist, Karlskrona (SE); Karl-Johan Östh, Karlskrona (SE); Ulf Kristiansson, Karlskrona (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 136 days.

(21) Appl. No.: 13/180,417

(22) Filed: Jul. 11, 2011

(65) Prior Publication Data

US 2013/0016667 A1    Jan. 17, 2013

(51) Int. Cl.
*H04W 4/00* (2009.01)
*H04J 3/16* (2006.01)
*H04W 72/00* (2009.01)

(52) U.S. Cl.
USPC ......... 370/329; 370/431; 370/468; 455/452.1

(58) Field of Classification Search
USPC ............. 370/329, 341, 431, 464, 465, 468; 455/450–452.2
See application file for complete search history.

(56) References Cited

U.S. PATENT DOCUMENTS

| | | | |
|---|---|---|---|
| 2001/0025310 A1* | 9/2001 | Krishnamurthy et al. | 709/223 |
| 2002/0004379 A1* | 1/2002 | Gruhl et al. | 455/403 |
| 2003/0005112 A1* | 1/2003 | Krautkremer | 709/224 |
| 2005/0049884 A1* | 3/2005 | Hunt et al. | 705/1 |
| 2007/0218916 A1 | 9/2007 | Cho | |
| 2008/0194266 A1 | 8/2008 | Islam et al. | |
| 2011/0151863 A1 | 6/2011 | Shaw et al. | |

FOREIGN PATENT DOCUMENTS

JP      2010-041581      2/2010
WO    WO 02/052885 A2    7/2002

OTHER PUBLICATIONS

International Search Report issued in Application Serial No. PCT/SE2012/050669 dated Feb. 15, 2013.
Written Opinion issued in Application Serial No. PCT/SE2012/050669 dated Feb. 15, 2013.

* cited by examiner

*Primary Examiner* — Kerri Rose
(74) *Attorney, Agent, or Firm* — Nixon & Vanderhye, P.C.

(57) ABSTRACT

A transmission controller (40) comprises a transmission request processor (44); a transmission reservation grantor (46); and, a transmission monitor (48). The transmission request processor (44) is configured to receive a request for a transmission reservation emanating from a client application executed at a wireless terminal (30). The transmission reservation grantor (46) is configured to use transmission rules stored for the wireless terminal (30) to make a determination whether to grant a transmission reservation responsive to the request for the transmission reservation. The transmission monitor (48) is configured (1) to perform a monitoring of the transmission operation for compliance with the transmission rules after granting the request for the transmission reservation and during a remainder of the transmission operation toward the wireless terminal associated with the transmission reservation and (2) to control bandwidth used by at least a portion of the remainder of the transmission operation in accordance with the monitoring.

18 Claims, 8 Drawing Sheets

… (1)

SYSTEM IMPOSED THROTTLED TRANSMISSION

TECHNICAL FIELD

This invention pertains to telecommunications, and particularly to the control of transmission of information to a wireless terminal.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network such as the third generation Universal Terrestrial Radio Access Network (UTRAN) of the Universal Mobile Telecommunications System (UMTS), several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks. Other networks, such as the Evolved Packet System (EPS), comprises the Evolved Universal Terrestrial Radio Access Network (E-UTRAN) (also known as the Long Term Evolution (LTE) radio access) and the Evolved Packet Core (EPC) (also known as System Architecture Evolution (SAE) core network). E-UTRAN/LTE is a variant of a wherein the radio base station nodes are directly connected to the EPC core network rather than to radio network controller (RNC) nodes. In general, in E-UTRAN/LTE the functions of a radio network controller (RNC) node are distributed between the radio base stations nodes (eNodeB's in LTE) and the core network. As such, the radio access network (RAN) of an EPS system has an essentially "flat" architecture comprising radio base station nodes without reporting to radio network controller (RNC) nodes.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks). MSCs and GSNs are in contact with a Home Location Register (HRL), which is a database of subscriber information.

Client applications executed on wireless terminals such as mobile terminals may transmit large amounts of data across a wireless or radio interface. Some clients can schedule the transmission so that it is performed at a specified time, e.g., a time when it is more convenient for the end user who owns or possesses the mobile terminal. For example, the end user may schedule a transmission (e.g., a download to a wireless terminal or an upload from a wireless terminal) at a time when the transmission price is lower, or at a time when the transmission does not disturb more important tasks that require the same bandwidth.

Not all client applications ("client") on the mobile terminals support transmission scheduling, and the clients that do support scheduling may support such scheduling in different ways. For example, a client may require that the end user choose at what fixed time the transmission shall start. In such case, the end user may not benefit from dynamic prices when fixed times are specified to control when transmissions start. In this regard, the transmission price can change depending on, for example, location, other usage, or changed subscriptions. In an environment in which transmission prices may change, it would be beneficial for the end user if the transmission started automatically when the price is right, instead of at a fixed time.

SUMMARY

In one of its aspects the technology disclosed herein concerns a method of transmitting information to a wireless terminal. The method comprises receiving a request for a transmission reservation from a client application executed at a wireless terminal; using transmission rules stored for the wireless terminal to make a determination whether to grant a transmission reservation responsive to the request for the transmission reservation; after granting the request for the transmission reservation and during a transmission operation toward the wireless terminal associated with the transmission reservation, monitoring the transmission operation for compliance with the transmission rules; and, controlling bandwidth used by at least a portion of the remainder of the transmission operation in accordance with the monitoring.

In an example embodiment and mode controlling the bandwidth used by at least the portion of the remainder of the transmission operation comprises selectively limiting the bandwidth used to a minimum bandwidth sufficient to keep the transmission reservation alive.

In an example embodiment and mode controlling the bandwidth used by at least the portion of the remainder of the transmission operation comprises selectively limiting the bandwidth used for compliance with the transmission rules.

In an example embodiment and mode monitoring the transmission operation comprises determining whether a change in a per unit cost of the transmission requires at least a temporary limiting of the bandwidth used by the at least a portion of the remainder of the transmission operation.

In an example embodiment and mode timing of the monitoring occurs in accordance with monitoring timing logic.

In an example embodiment and mode the method further comprises configuring the monitoring timing logic so that the monitoring occurs at periodic intervals.

In an example embodiment and mode the method further comprises configuring the monitoring timing logic so that the monitoring is dependent upon at least one of network conditions and business conditions.

In an example embodiment and mode the transmission rules specify at least one of a per unit cost limit for the transmission operation and a maximum total transmission cost.

In an example embodiment and mode the download transmission comprises a download of information to the wireless terminal In an example embodiment and mode the download transmission comprises an upload of information to the wireless terminal In another of its aspects the technology disclosed herein concerns a transmission controller which comprises a transmission request processor; a transmission reservation grantor; and, a transmission monitor. The transmission request processor is configured to receive a request for a transmission reservation emanating from a client application executed at a wireless terminal. The transmission reservation grantor is configured to use transmission rules stored for the wireless terminal to make a determination whether to grant a transmission reservation responsive to the request for the transmission reservation. The transmission monitor is configured (1) to perform a monitoring of the transmission operation for compliance with the transmission rules after granting the request for the transmission reservation and during a remainder of the transmission operation toward the wireless terminal associated with the transmission reservation and (2) to control bandwidth used by at least a portion of the remainder of the transmission operation in accordance with the monitoring.

In an example embodiment the transmission monitor is configured to selectively limit the bandwidth used for compliance with the transmission rules.

In an example embodiment transmission monitor is configured to control the bandwidth used by at least the portion of the remainder of the transmission operation by selectively limiting the bandwidth used to a minimum bandwidth sufficient to keep the transmission reservation alive.

In an example embodiment the transmission monitor is configured to determine whether a change in a per unit cost of the transmission requires at least a temporary limiting of the bandwidth used by the at least a portion of the remainder of the transmission operation.

In an example embodiment the transmission controller further comprises a monitoring timer configured to cause the monitoring to occur at periodic intervals.

In an example embodiment the transmission controller further comprises a monitoring timer configured to cause the monitoring to be dependent upon at least one of network conditions and business conditions.

In an example embodiment the transmission rules specify at least one of a per unit cost limit for the transmission operation and a maximum total transmission cost.

In an example embodiment the transmission comprises a download of information to the wireless terminal.

In an example embodiment the transmission comprises an upload of information from the wireless terminal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1A:
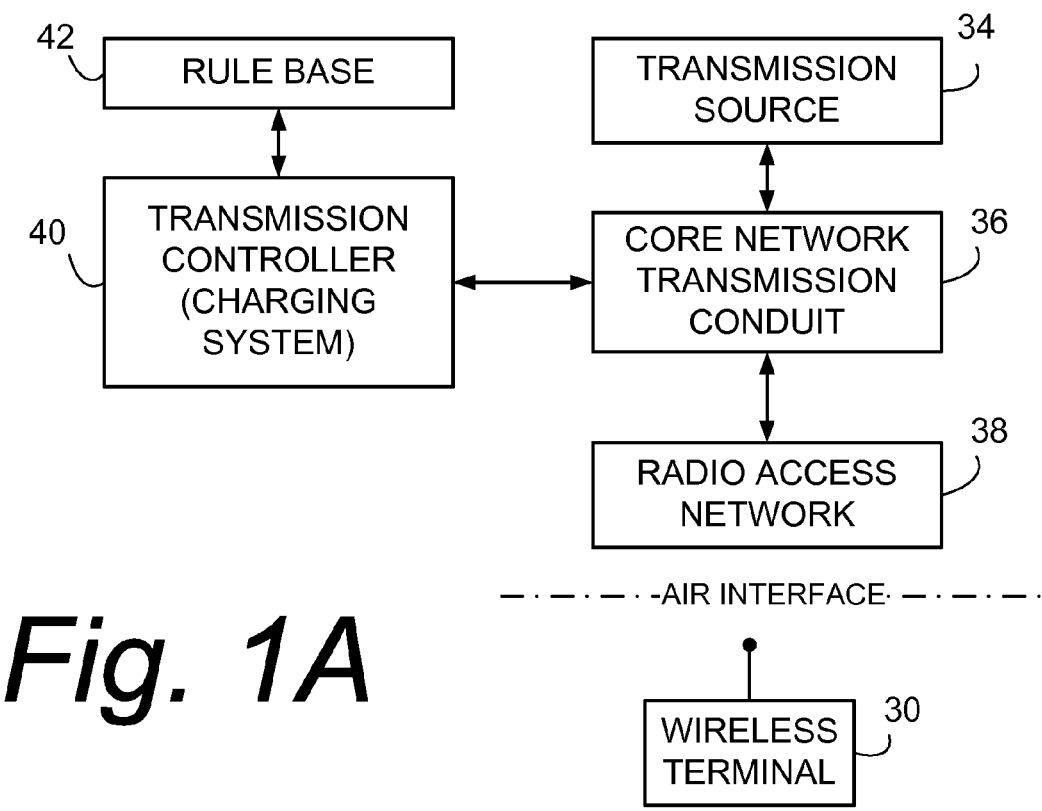
FIG. 1A is a diagrammatic view illustrating portions of an example communications system in which a wireless terminal obtains a transmission of information (e.g., a download) from a transmission source.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The technology disclosed herein pertains to throttled transmission of data.

Such throttled transmission may be either download of data from a source (such as core network) to a wireless terminal, or upload of data from a source (such as a wireless terminal) to a target (such as the core network). Thus, unless otherwise clear from the context, the word "transmission" is employed generically herein to refer both to download and upload.

FIG. 1A illustrates portions of an example communications system in which a wireless terminal 30 obtains a transmission of information (in the form of a download) from a transmission source 34. In an example embodiment the transmission source 34 may be the internet or web-based source, or a server or network of servers, and is accessible for providing data to the wireless terminal 30. As shown in FIG. 1A, the data provided by transmission source 34 is transmitted to the wireless terminal 30 through a transmission conduit 36A and through a radio access network 38. The data provided by transmission source 34 is transmitted from the radio access network 38 to the wireless terminal 30 over an air or radio interface depicted by a dotted-dashed line in FIG. 1A.

FIG. 1A further illustrates transmission controller 40 connected so as to control transmission of the transmission data. In the particular embodiment of FIG. 1A for transmission control purposes the transmission controller 40 is shown as being connected to transmission conduit 36A. In a particular example implementation, the transmission controller 40 comprises, at least in part, a charging system. The charging system may form a portion or aspect of an operator's equipment and/or logic for accessing financial costs of usage of telecommunications services and may even participate in or interface with the rendering of invoices, bills or accounts to customers (e.g., end users or subscribers) of a telecommunications network. The transmission controller 40 has various connections to or interfaces with other aspects of a core network as well as other entities which are administrative and/or managerial in nature. For example, transmission controller 40 has access to or is connected to, or may even comprise rule base 42. As explained herein, rule base 42 stores certain rules (e.g., criteria or requirements) which are prescribed or preconfigured by a user of the wireless terminal 30 with respect to transmission operations which may be requested by client applications executed on the wireless terminal 30.

Figure 1B:
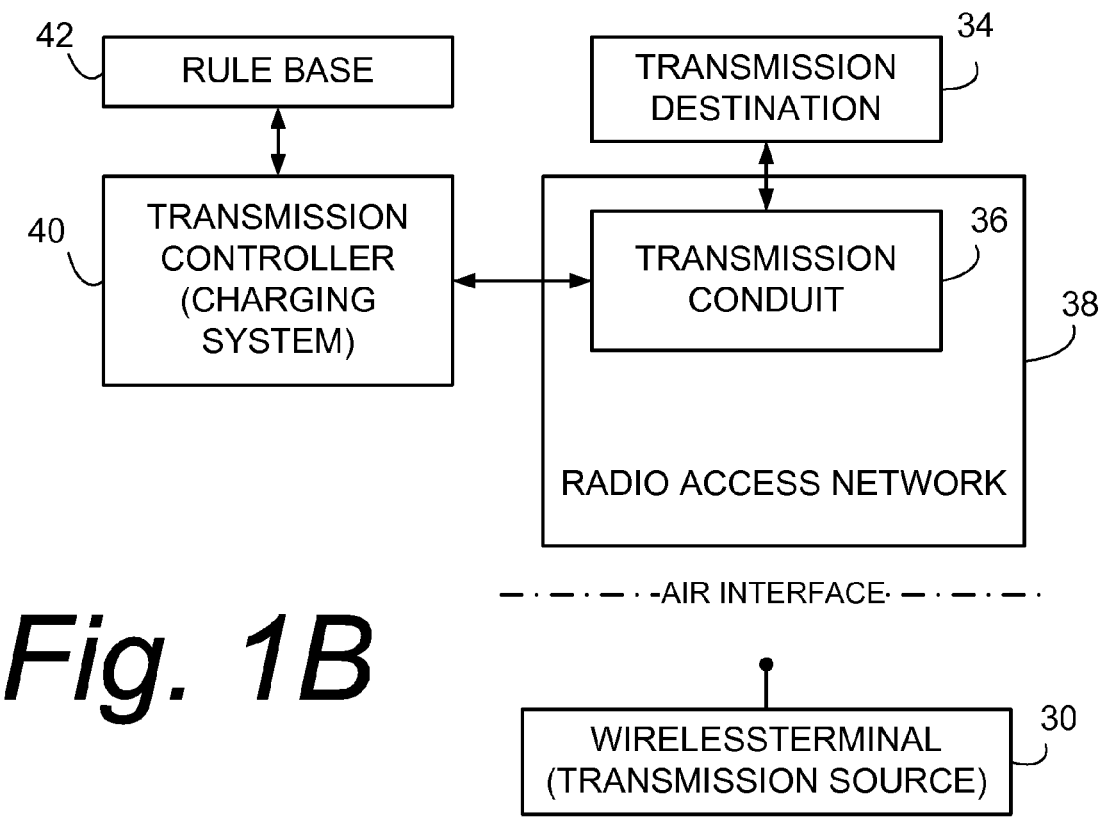
FIG. 1B is a diagrammatic view illustrating portions of an example communications system in which a wireless terminal sends a transmission of information (e.g., an upload) to a transmission target.

FIG. 1B illustrates portions of an example communications system in which a wireless terminal 30 (the source of the transmission) sends or originates a transmission of information (in the form of an upload) to a transmission destination 43. The transmission destination 43 may be a core network, for example. As shown in FIG. 1B, the data provided by the transmission source of wireless terminal 30 is transmitted to transmission destination 43 through transmission conduit 36B. In FIG. 1B the transmission conduit 36B is shown as comprising radio access network 38. In at least some measure the radio access network 38 governs usage of frames or channels of information transmitted in either direction over the air or radio interface. For example, even for transmission uploads the radio access network 38 may grant the wireless terminal 30 access to certain uplink channels by which the wireless terminal 30 may transmit or upload data through radio access network 38 to the transmission destination 43.

FIG. 1B also illustrates transmission controller 40 connected so as to control transmission of the transmission data in the uplink, e.g., an upload transmission. In the particular embodiment of FIG. 1B for transmission control purposes the transmission controller 40 is shown as being connected to radio access network 38 which serves or comprises the transmission conduit 36B.

As in the FIG. 1A embodiment, the transmission controller 40 comprises, at least in part, a charging system which may form a portion or aspect of an operator's equipment and/or logic for accessing financial costs of usage of telecommunications services and may even participate in or interface with the rendering of invoices, bills or accounts to customers (e.g., end users or subscribers) of a telecommunications network. The transmission controller 40 has various connections to or interfaces with other aspects of a core network as well as other entities which are administrative and/or managerial in nature. For example, transmission controller 40 has access to or is connected to, or may even comprise rule base 42. As explained herein, rule base 42 stores certain rules (e.g., criteria or requirements) which are prescribed or preconfigured by a user of the wireless terminal 30 with respect to transmission operations which may be requested by client applications executed on the wireless terminal 30.

As understood from the foregoing, in the FIG. 1B embodiment the transmission controller 40 may control or throttle an upload type transmission by requesting or requiring the radio access network 38 to curtail or limit the uplink bandwidth that is granted to wireless terminal 30 when wireless terminal 30 is performing an upload transmission operation.

As used herein, wireless terminal 30 may be any wireless device and as such may be called a user equipment unit (UE), a mobile terminal, or a mobile station, such as a mobile telephone ("cellular" telephone) or a laptop with mobile termination, and thus can be, for example, any portable, pocket, hand-held, computer-included, or car-mounted mobile device which communicates voice and/or data with a radio access network. Alternatively, the wireless terminal may be a fixed wireless device, e.g., fixed cellular devices/terminal which is part of a wireless local loop or the like.

In either the download embodiment of FIG. 1A or the upload embodiment of FIG. 1B the data provided by the respective transmission source (by transmission source 34 in FIG. 1A or the wireless terminal 30 in FIG. 1B) may comprise any type of information usable by or for wireless terminal 30, including but not limited to files of any format suitable for use by the wireless terminal 30, whether executable or not, video, pictures, binary data and data used for services such as online gaming, Really Simple Syndication (RSS) feeds, etc.

Figure 2:
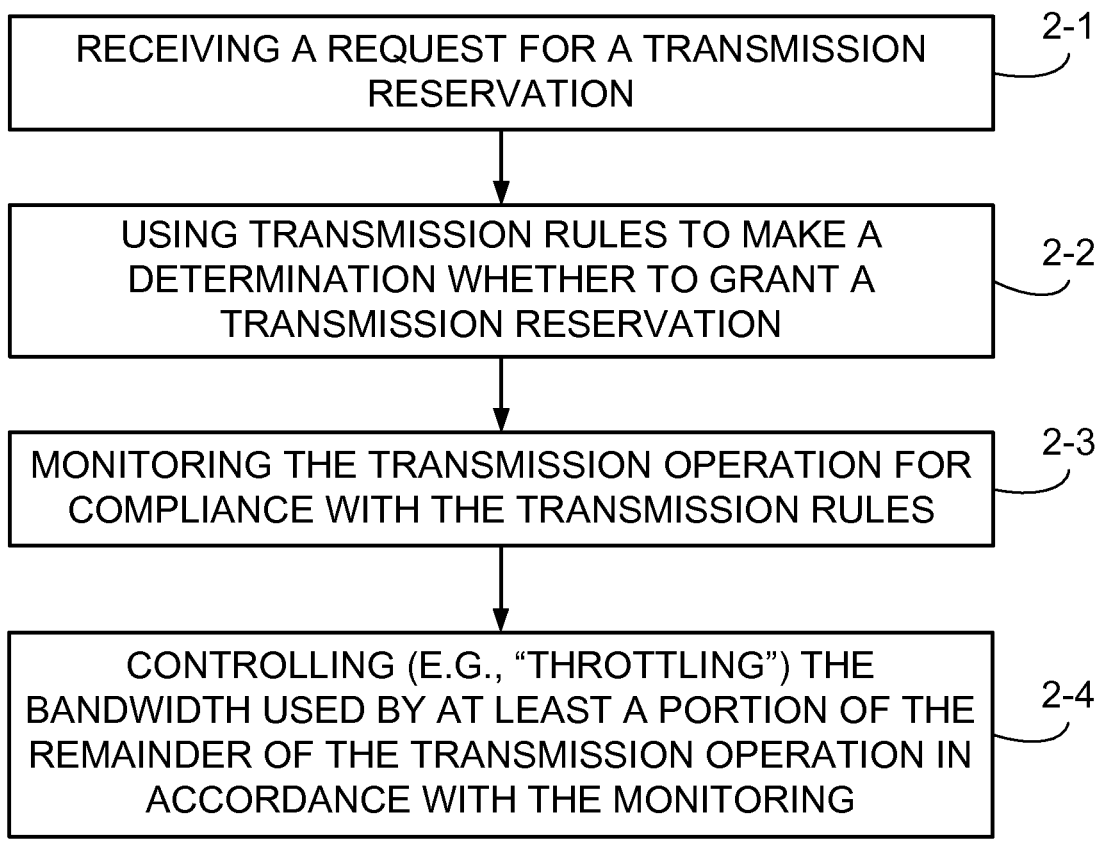
FIG. 2 is a flowchart which illustrates basic, example acts or steps which are performed by a transmission controller according to an example embodiment and mode.

FIG. 2 illustrates basic, example acts or steps which are performed by transmission controller 40. Act 2-1 comprises receiving a request for a transmission reservation from a client application executed at the wireless terminal 30. Act 2-2 comprises using transmission rules stored for the wireless terminal (e.g., in rule base 42) to make a determination whether to grant a transmission reservation responsive to the request for the transmission reservation. Act 2-3 comprises, after granting the request for the transmission reservation and during a transmission operation toward/from the wireless terminal 30 associated with the transmission reservation, monitoring the transmission operation for compliance with the transmission rules. Act 2-4 comprises controlling bandwidth used by at least a portion of the remainder of the transmission operation in accordance with the monitoring. Such controlling of the bandwidth used in the transmission operation in accordance with the monitoring is also herein nicknamed as "throttling" of the transmission operation. At any point in time in mid-transmission such throttling may result in selectively permitting, increasing, or selectively halting the transmission operation, e.g., selectively permitting, increasing, or selectively halting the flow of transmission data to wireless terminal 30, depending on compliance with the transmission rules at such point in time. By "halting the flow of transmission data" is meant a limiting the bandwidth used by the transmission operation, and preferably limiting the bandwidth used by the transmission operation to a minimum bandwidth sufficient to keep the transmission reservation alive. The used bandwidth may be required to exceed a minimum limit to keep the reservation alive, e.g., for example to avoid time out or release of connections such as a GPRS PDP Context.

Figure 3:
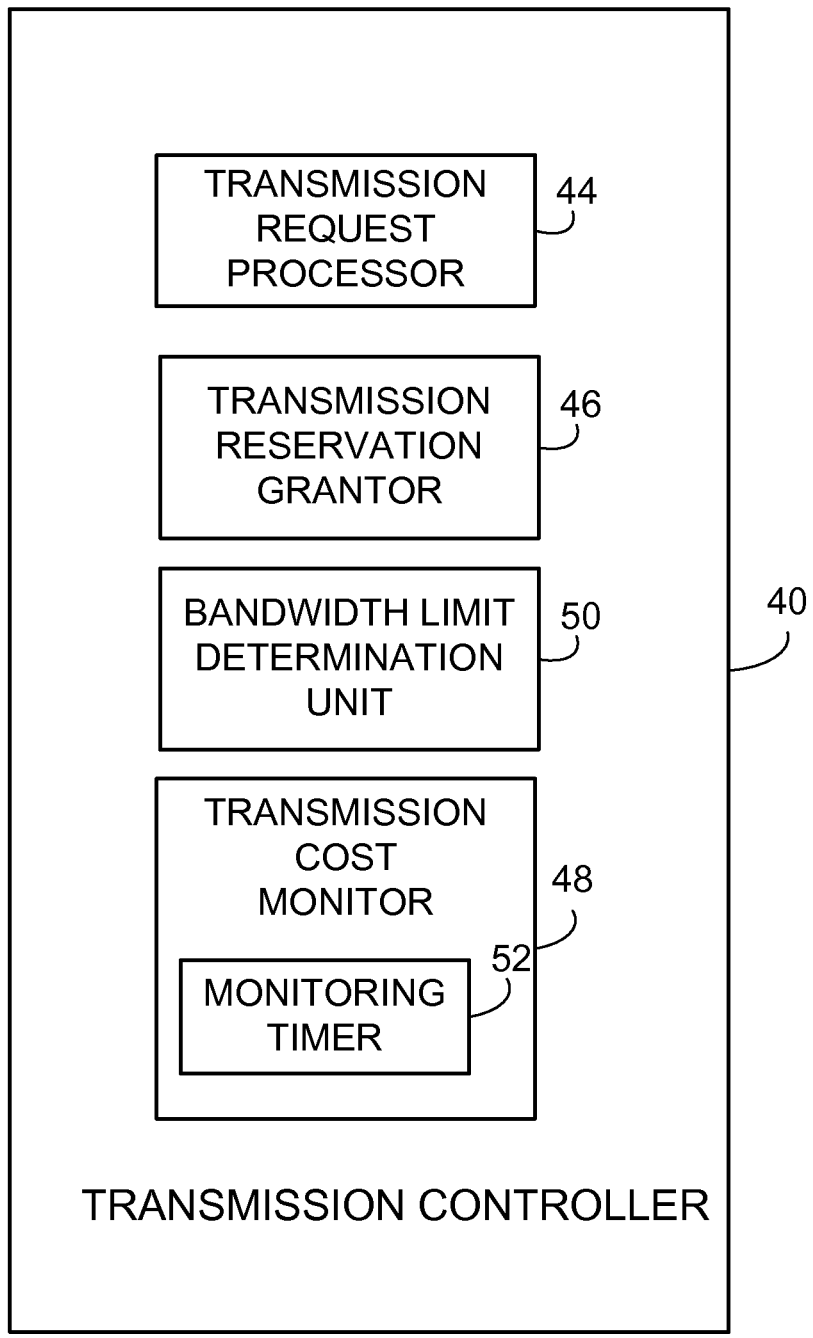
FIG. 3 is a schematic view showing various pertinent constituent units and functionalities of a transmission controller according to a non-limiting example embodiment.

The transmission controller 40 serves as a centralized point, outside of the wireless terminal 30 and outside of radio access network 38, for controlling all scheduling of transmissions. The transmission scheduling as implemented and controlled by transmission controller 40 protects the end user from being dependent on client application support for transmission scheduling. FIG. 3 shows various pertinent basic constituent units and functionalities of transmission controller 40 according to a non-limiting example embodiment. FIG. 3 thus illustrates transmission controller 40 as comprising transmission request processor 44; transmission reservation grantor 46; transmission cost monitor 48; and, transmission bandwidth limit determination unit 50. The transmission request processor 44 is configured to receive a request for a transmission reservation emanating from a client application executed at wireless terminal 30. The transmission reservation grantor 46 is configured to use transmission rules stored for the wireless terminal (e.g., stored at rule base 42) to make a determination whether to grant a transmission reservation responsive to the request for the transmission reservation. The transmission cost monitor 48 is configured (1) to perform a monitoring of the transmission operation for compliance with the transmission rules after granting the request for the transmission reservation and during a transmission operation toward/from the wireless terminal associated with the transmission reservation and (2) to control bandwidth used by at least a portion of the remainder of the transmission operation in accordance with the monitoring. As indicated above, the transmission cost monitor 48 may selectively permit or selectively halt (e.g., limit), or increase, and thus "throttle", the transmission operation depending on compliance with the transmission rules at any point in time in the transmission operation.

Figure 4:
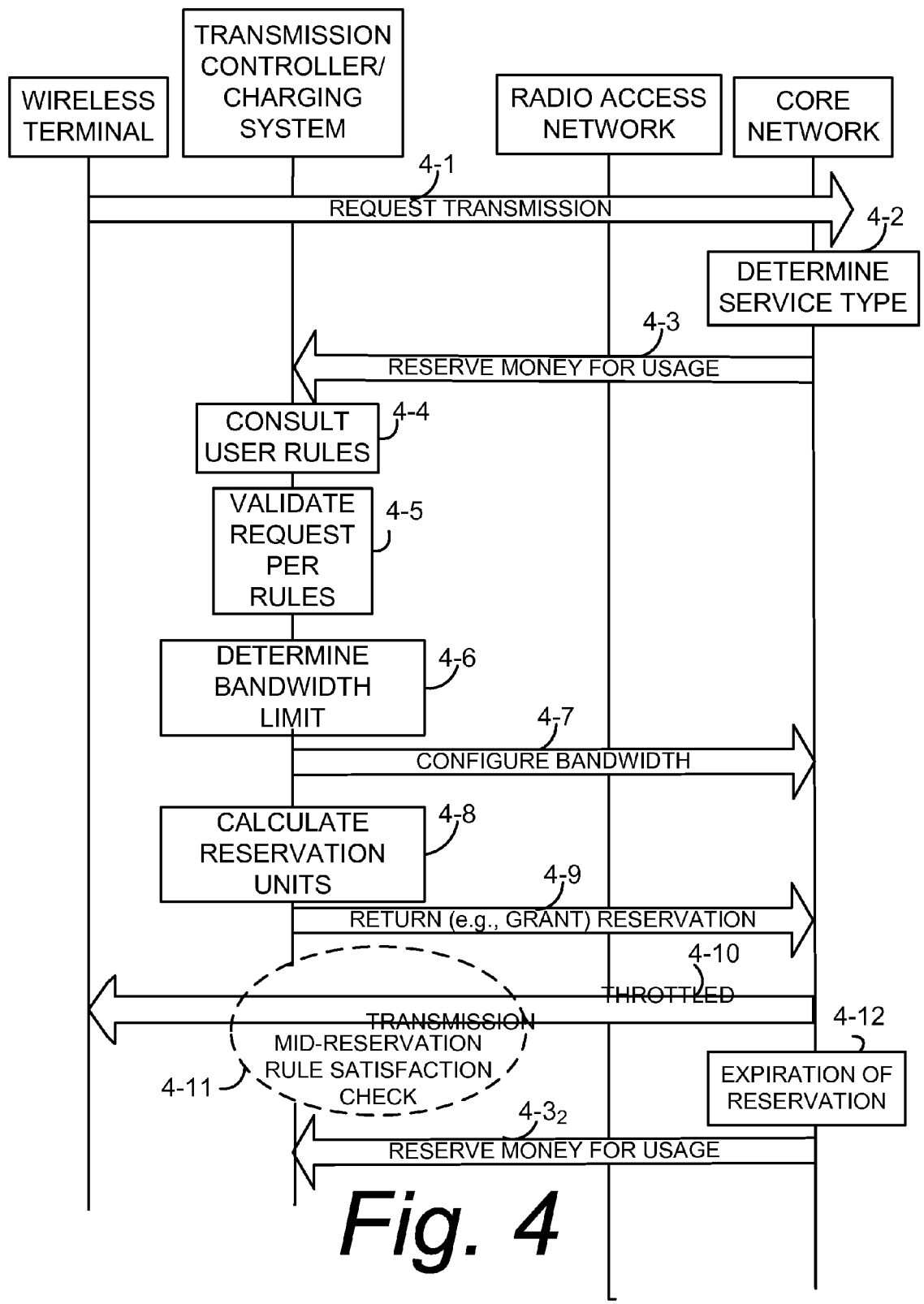
FIG. 4 is a diagrammatic view illustrating various basic acts of steps comprising a throttled transmission operation.

FIG. 4 illustrates, in more detail, certain example acts or steps involved in a transmission procedure according to an example embodiment and mode. In the FIG. 4 illustration, the role of transmission source 34 is generically played by the core network and the role of core network conduit 36 may be played by an illustrated Gateway GPRS Support Node (GGSN) which comprises the core network. While FIG. 4 thus depicts the FIG. 1A download embodiment and mode, it will be understood by the person skilled in the art how the FIG. 4 teachings are also applicable to the upload embodiment of FIG. 1B. FIG. 4 further additionally denominates the transmission controller 40 as being a charging system, which indeed it may be as explained above.

As act 4-1 a client application which is being executed on a wireless terminal requests a transmission. In other words, the client application sends a reservation request (depicted by the arrow 4-1 in FIG. 4) to the core network. The reservation request comprises information about the type of service involved in the transmission, and an indication of how much volume the reservation shall require or need. In an example implementation, the reservation request may also include a total size parameter whereby the end user can also specify a maximum price the transmission is allowed to cost. Such indication of volume may be expressed in any appropriate units, such as kilobytes, for example. The technology disclosed herein is not limited to any particular client application or type of information that is requested to be transmitted. For example, a non-limiting list of example client applications that may request transmission include Internet browsing applications, e-mail clients, and peer to peer (p2p) applications. The service types may depend upon or be related to the type of client application which requests the transmission. Example service types may include, for example, file transfer protocol (FTP) hypertext transfer protocol (HTTP), Bit Torrent.

The transmission of the reservation request is shown in FIG. 4 as being routed through a radio access network (RAN). The radio access network comprises a base station node which both communicates over a radio interface with the wireless terminal and is connected to the core network. It will be understood that other communications described herein between the wireless terminal and the core network also occur through the radio access network. The radio assess network may be any of several types, including but not limited to UTRAN and Long Term Evolution (LTE), for example.

As act 4-2 the core network determines the type of service that is involved in or for the transmission that was requested in act 4-1. Act 4-2 may be performed by any appropriate core network node or entity, such as a Serving GPRS Support Node, for example. In an example embodiment and mode, the core network determines the type of service that is involved in or for the transmission. The act of determining the type of service may be performed, for example, by determining the type of protocol or by deep packet inspection. Deep packet inspection (DPI) is typically performed by packet network equipment which is not an endpoint of a communication using non-header content (typically the actual payload) to, in the context of the present technology, determine the type of service that is involved in or for the transmission.

Act 4-3 comprises the core network sending a request (the request for transmission reservation) to the transmission controller 40 to reserve funding for the complete transmission or a part of the transmission. In an example embodiment the core network actually decides whether the funding is to be reserved for the complete transmission or part of the transmission, and the transmission controller (charging system) 40 executes accordingly. Thus, there may be two scenarios: a first scenario in which a complete transmission is performed (typically as is the case for fixed priced services) and a second scenario (which also may be a default scenario) in which the reservation is of a configurable size. If the complete reservation is not used, the remainder is returned to the subscriber.

The request for transmission reservation is handled by transmission request processor 44. Upon receipt of the reserve funding request sent as act 4-3, as act 4-4 the transmission controller 40 (e.g., transmission request processor 44) consults any transmission rules or transmission criteria which have been established for the wireless terminal by the end user. Such transmission rules may be, for example, price per unit limits for transmissions of different type of services. Other example transmission rules may include a maximum transmission per hour, or a total transmission price. Such transmission rules or transmission criteria are illustrated in FIG. 1A as being stored in rule base 42. The rule base 42 may be stored in a memory or register maintained at an external node, or maybe included in or comprise the charging system itself. Accordingly, act 4-3 comprises the transmission controller 40 consulting the rule base 42.

Act 4-5 through 4-9 are essentially performed by transmission reservation grantor 46 of the transmission controller 40 (e.g., charging system) of FIG. 2. Act 4-5 comprises the transmission controller 40 attempting to validate the transmission request, given both the end user's rules for a transmission of the specified service type (as determined by act 4-4) and the current price for the transmission. The current price for the transmission may be expressed, for example, as a current per unit cost for transmitting information. The transmission controller 40 knows the current price for the transmission by rating the requested transmission based on a tariff list or a price list.

Act 4-6 comprises the transmission controller 40 determining a bandwidth limit for the transmission. By "bandwidth limit" is meant a restriction of download and upload throughput (e.g., download/upload speed [in kilobits per second, for example]. In an example mode, the bandwidth limit for transmission is determined by spare capacity of the network, also adjusting for temporary or permanent reduction of throughput.

Act 4-7 comprises the transmission controller 40 sending the bandwidth limit to a node or entity in the core network which performs the role of core network conduit 36. Such a core network entity may be, for example, a Gateway GPRS Support Node (GGSN) node.

As act 4-8 the transmission controller 40 calculates how many units shall be allowed to be used before a new reservation must be made/done, e.g., how many units can be transmitted before a new reservation must be made. The "units" of transmission can be any appropriate unit of measure of data, such as (for example): Kbytes, seconds, or frames (e.g., for movies).

Act 4-9 comprises the transmission controller 40 returning the number of units (as calculated at act 4-8) to the core network. Thus, act 4-9 is the sending of a reservation grant message to the core network. Upon receipt of the number of units for the reservation, as act 4-10 the core network begins the transmission of information to/from the wireless terminal through the radio access network.

In the sense of the FIG. 1A download embodiment and mode, act 4-10 comprises the core network sending the transmission (e.g., the transmission content of the current reservation) to the wireless terminal in throttled manner, e.g., as a "throttled transmission". In "throttled manner" or a "throttled transmission" means that the transmission controller 40 monitors and/or checks whether the transmission rules as established by the end user are satisfied, not only as a condition precedent to transmission, but also let one or more times after the granting of the reservation. That is, such post-grant checking or monitoring occurs during the time of and/or in the course of the already-granted transmission reservation, e.g., during the transmission operation associated with the already-granted reservation. Such mid-reservation/mid-transmission checking of rule satisfaction is depicted by act 4-11 of FIG. 4 and is, in an example embodiment, implemented by transmission cost monitor 48.

It will be appreciated that, for the FIG. 1B upload embodiment and mode, act 4-10 would alternatively comprise the wireless terminal 30 sending the transmission (e.g., the transmission content of the current reservation) through the radio access network 38 and to the transmission destination 43 in throttled manner. The mid-reservation/mid-transmission checking of rule satisfaction depicted by act 4-11 of FIG. 4 also applies to the FIG. 1B upload embodiment and mode, and is, in an example embodiment, implemented by transmission cost monitor 48.

In an example embodiment the transmission controller 40 comprises monitoring timer 52. The monitoring timer 52 is programmed or otherwise configured with monitoring timing logic to cause or prompt mid-reservation/mid-transmission checking of rule satisfaction at any suitable time. The suitable time for checking or monitoring may be determined by an operator and may be based, e.g., on data such as network conditions and/or business conditions. An example network condition which may be taken into consideration includes network congestion. An example business condition which may be taken into consideration includes credit risk information for a particular end user or customer. Thus, the timing of the monitoring or checking of rule satisfaction may be periodic, aperiodic, or otherwise pre-determined according to any logic or timing routing as implemented by monitoring timer 52 (e.g., monitoring timing logic). Such mid-reservation/mid-transmission checking or monitoring timing routine or logic may be embodied in executable, non-transitory instructions stored in a memory and executed by a processor of the charging system.

In an example implementation mentioned above, when the total transmission size is included as an input parameter to the reservation request, the end-user may also specify a maximum price the transmission is allowed to cost. The transmission controller 40 (e.g., charging system) then looks at the remaining volume to transmit and multiplies the remaining volume with the current price per unit. If the remaining cost and the cost for the already transmitted volume is less than the configured maximum price, the transmission is considered to be "active", otherwise the transmission is "halted" until the conditions is fulfilled.

As explained herein, if the transmission rules as established by the end user are still satisfied, the transmission of the already-granted reservation continues (e.g., essentially uninterrupted by the transmission controller 40) during the reservation. However, if the transmission rules as established by the end user are found not to be satisfied at the time of a mid-transmission check, the transmission is halted even though the reservation may not yet have expired (e.g., not expired in terms of granted units for transmission).

Act 4-12 of FIG. 4 represents expiration of the reservation, e.g., expiration of the reservation sought as act 4-3 and granted as act 4-9. Expiration of the reservation occurs, e.g., when an amount of data corresponding to the units of reservation (determined at act 4-8) have already been sent from the transmission source (e.g., the core network in FIG. 1A or the wireless terminal 30 in FIG. 1B) through the radio access network to the destination (e.g., to the wireless terminal 30 in FIG. 1A and to the transmission destination 43 in FIG. 1B).

In some situations it may occur that, when a reservation has expired, e.g., when through execution of act 4-10 the client application has transmitted the bandwidth limit (e.g., has transmitted all the units granted in at 4-9), further information yet remains to be transmitted to/from the wireless terminal as a part of the transmission. In such situations, as act $4-3_2$ the core network sends a new reservation request to the transmission controller 40. If the price is acceptable according to the end users preferences, a request that removes the bandwidth limitation is sent to the core network (e.g., GGSN). The phrase "bandwidth limitation" means a requirement or condition which imposes a low throughput, so that removal of the bandwidth limitation results in removal of a low throughput constraint. The numbers of units to allow for the reservation is also recalculated and returned to the core network in similar manner as act 4-9. Although not shown in FIG. 4, it will be appreciated that similar acts such as act 4-4 through 4-9 may be performed subsequent to act $4-3_2$, and indeed that further reservations (e.g., further act $4-3_i$) may be performed for other reservations i which comprise the overall transmission. Thus, a transmission may comprise one or more (e.g., i number) of reservations.

Figure 5:
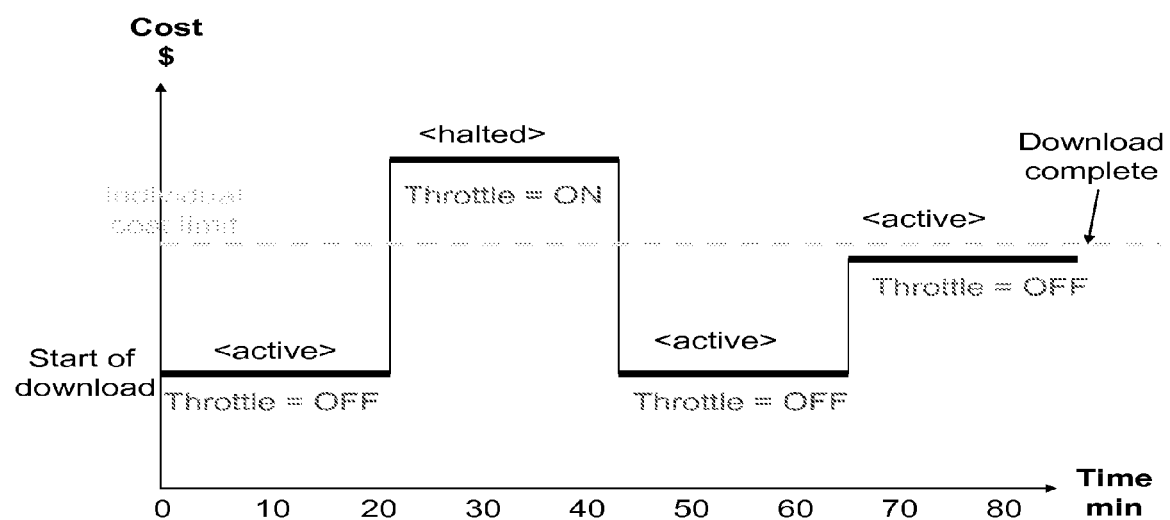
FIG. 5 is a graphical view depicting throttling of a transmission operation over time as a function of transmission cost.

FIG. 5 is a graphical view depicting performance of act 4-13 and performance of transmission cost monitor 48. FIG. 5 also illustrates throttling of a transmission operation over time as a function of transmission cost.

FIG. 5 initially shows start of the transmission operation at time zero, at which time the transmission per unit cost is sufficiently low so that the transmission rule established for/by the end user of the wireless terminal is satisfied. From time zero up until time twenty minutes the transmission is active (e.g., the transmission throttle is OFF) in view of the rule-assessed satisfactory transmission cost.

At the time twenty minutes as shown in FIG. 5 the transmission cost monitor 48 determines that the transmission cost per unit has changed, i.e., has increased significantly and resulted in transmission rule violation. Accordingly, from time twenty minutes to about time forty two minutes the transmission throttle is turned ON, so that the transmission operation is at least temporarily halted. As indicated above, by "halting" is meant a limiting the bandwidth used by the transmission operation, and preferably limiting the bandwidth used by the transmission operation to a minimum bandwidth sufficient to keep the transmission reservation alive. The minimum bandwidth required to keep a transmission reservation alive may depend on such factors as specific service requirements, device platform requirements, and core network node requirements.

As further shown in FIG. 5, just after about time forty two minutes the transmission cost monitor 48 detects that the transmission cost per unit has returned to an acceptable amount (in fact, the initial cost which as in effect at time zero), so that the transmission throttle can be turned OFF and the transmission operation can again become active. FIG. 5 further shows the transmission cost monitor 48 detecting at time sixty five minutes an increase in transmission per unit cost, but since the increase in transmission per unit cost as detected at time sixty five minutes does not violate the transmission rules for the wireless terminal, the transmission throttle remains OFF and thus the transmission operation remains active. FIG. 5 further illustrates that the transmission is completed and thus terminated at a time after time eighty minutes.

As used herein, the term "cost", such as in the phrase "transmission per unit cost, for example, is not to be limited to any particular type of resource. For example, the term "cost" is not to be limited to a monetary cost, but can be in terms of another type of resource. For example, an end-user may purchase a package of 2 GB transmission which is valid for a month time, in which normally every transmitted byte is assessed a cost or price of one byte. But during a certain portion of the month there may be a discount or sale in which the cost or price for a transmitted byte is assessed as only half a byte, for example.

Figure 6:
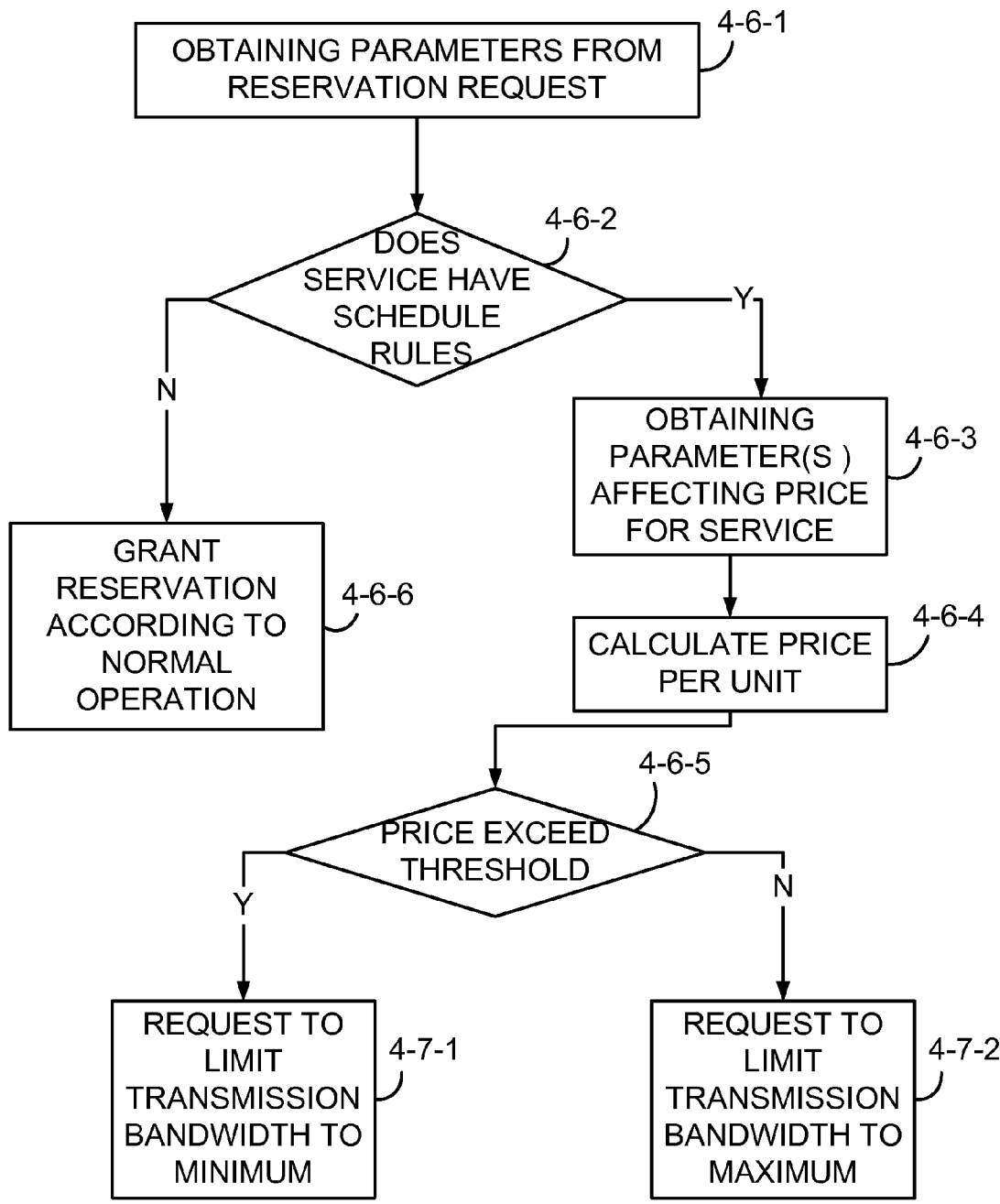
FIG. 6 is a flowchart illustrating certain sub-acts comprising bandwidth limit determination act in an example mode and embodiment of a throttled transmission.

FIG. 6 illustrates certain acts performed by a bandwidth limit determination unit or functionality (e.g., bandwidth limit determination unit 50) of the charging system (e.g., of the transmission controller 40) in an example embodiment and mode. Some of the acts of FIG. 6 are essentially sub-acts comprising act 4-6 and act 4-7 of FIG. 4. Sub-act 4-6-1 comprises the bandwidth limit determination unit 50 fetching the information obtained, e.g., from the reservation request of act 4-1 (e.g., type of service and volume). Sub-act 4-6-2 comprises checking whether the service has schedule rules, e.g., the end user rules. If the service does not have schedule rules, then the charging system should grant the reservation according to normal operation (depicted as sub-act 4-6-6 of FIG. 6).

If it is determined at sub-act 4-6-2 that the service does have rules, as sub-act 4-6-3 any parameter(s) which control, affect, or influence the prices of the specific service are obtained. Such other parameter(s) that control or influence the price for the specific service may include, for example, user category, network usage, network capacity, charged usage, customer profitability, regulatory constrains, etc.

Sub-act 4-6-4 comprises calculating the price per unit on the basis of the information obtained from the reservation request of act 4-1 (e.g., type of service and volume) and the other parameter(s) determined by sub-act 4-6-3 that control or influence the price for the specific service.

If it is determined at act 4-6-5 that the price per unit is over a threshold, as sub-act 4-7-1 a request is sent to the core network (GGSN) to limit the transmission bandwidth to a minimum. If the price per unit is below the threshold, as sub-act 4-8-2 the bandwidth limit is removed by sending a request to the core network (e.g., GGSN) to limit the transmission bandwidth to a maximum. The threshold used in sub-act 4-6-5 may be known or established by evaluating the user configuration, e.g., evaluating the user level and/or user category level configuration, which may be stored in the online Charging System 40.

It is possible, in the course of a transmission, that the per unit cost of the transmission (e.g., the current per unit cost for transmitting information) may change over time, and thus the per unit cost of the transmission may change during the transmission, e.g., in mid-transmission. The mid-transmission rule satisfaction checking (depicted by act 4-11 of FIG. 4) is employed to ensure that changes to the price (e.g., changes to the current per unit cost for transmitting information) do not adversely affect the user's cost of the transmission and/or do not cause violation of the rules configured for the user (such as the transmission rules or transmission criteria consulted in act 4-4). At one or more times during the transmission, the mid-reservation rule satisfaction checking of act 4-11 re-evaluates whether the transmission is to be at least temporarily halted or active. The re-evaluation whether to halt or continue the transmission may be performed at various times during the transmission, e.g., at regular intervals or at other (e.g., irregular) times, or in accordance with a monitoring timing logic. The monitoring timing logic may be pre-determined and pre-stored in the charging system (e.g., transmission controller 40), having been originally developed by the charging system or externally. Alternatively, the check timing logic may be adaptively developed by the charging system in response to a changing telecommunications and/or business environment.

In one example embodiment and mode, the check timing logic prompts or causes the re-evaluation of act 4-11 at time intervals. In some such example embodiments and modes the charging system controls the intervals (e.g., the duration of the intervals) by looking at the current bandwidth limit and by calculating a maximum number of units that can be consumed during the time limit until next reservation. The number of units allocated to the existing reservation may be reduced to cater for scenarios where the maximum bandwidth is not achieved.

Figure 7:
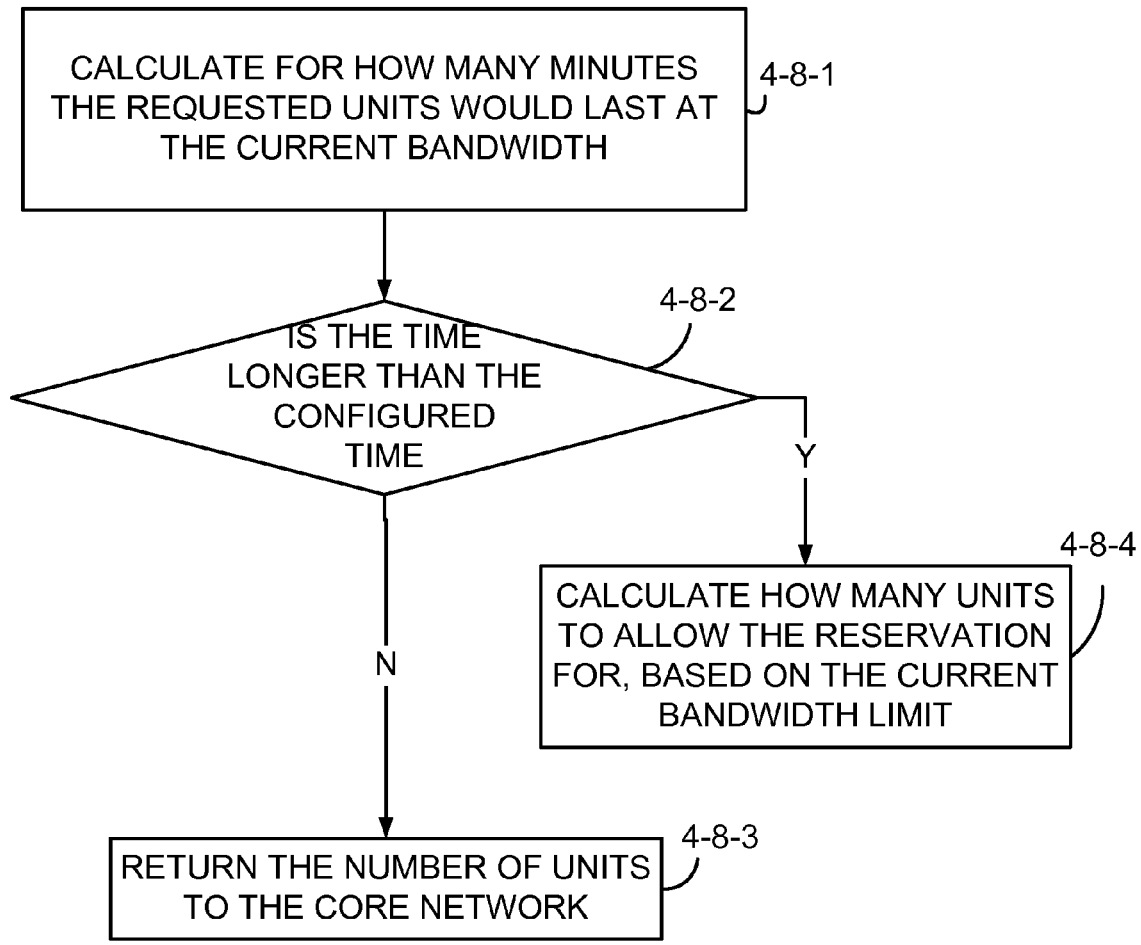
FIG. 7 is a flowchart illustrating certain example sub-acts performed in an act of determining how many units can be transmitted before a new reservation must be made.

FIG. 7 illustrates certain example sub-acts performed by the transmission controller 40 in conjunction with act 4-8, calculating how many units can be transmitted before a new reservation must be made. Sub-act 4-8-1 comprises calculating how many minutes the requested units would last at the current bandwidth. The "requested units" for which the calculation of sub-act 4-8-1 is made are typically smaller than the volume the reservation shall require or need (e.g., indication provided in act 4-1 of FIG. 4), in order to limit excess reservations. Sub-act 4-8-2 comprises determining whether the time (minutes) calculated in sub-act 4-8-1 is longer than the configured time. Here the configured or default time describes for how long the reservations are maximum valid, so that the reservation should time out so that price changes or other changes of session parameters such as bandwidth can be adjusted in a timely and orderly manner. If the determination of sub act 4-8-2 is negative, then as sub-act 4-8-3 the transmission controller 40 returns the number of units (the requested units) to the core network. On the other hand, if the determination of sub-act 4-8-2 is positive, then as sub-act 4-8-4 the transmission controller 40 calculates how many units to allow for the reservation, based on the current bandwidth limit. Thereafter, as reflected by sub-act 4-8-3, the transmission controller 40 returns the number of units (as calculated by sub-act 4-8-4) to the core network.

Figure 8:
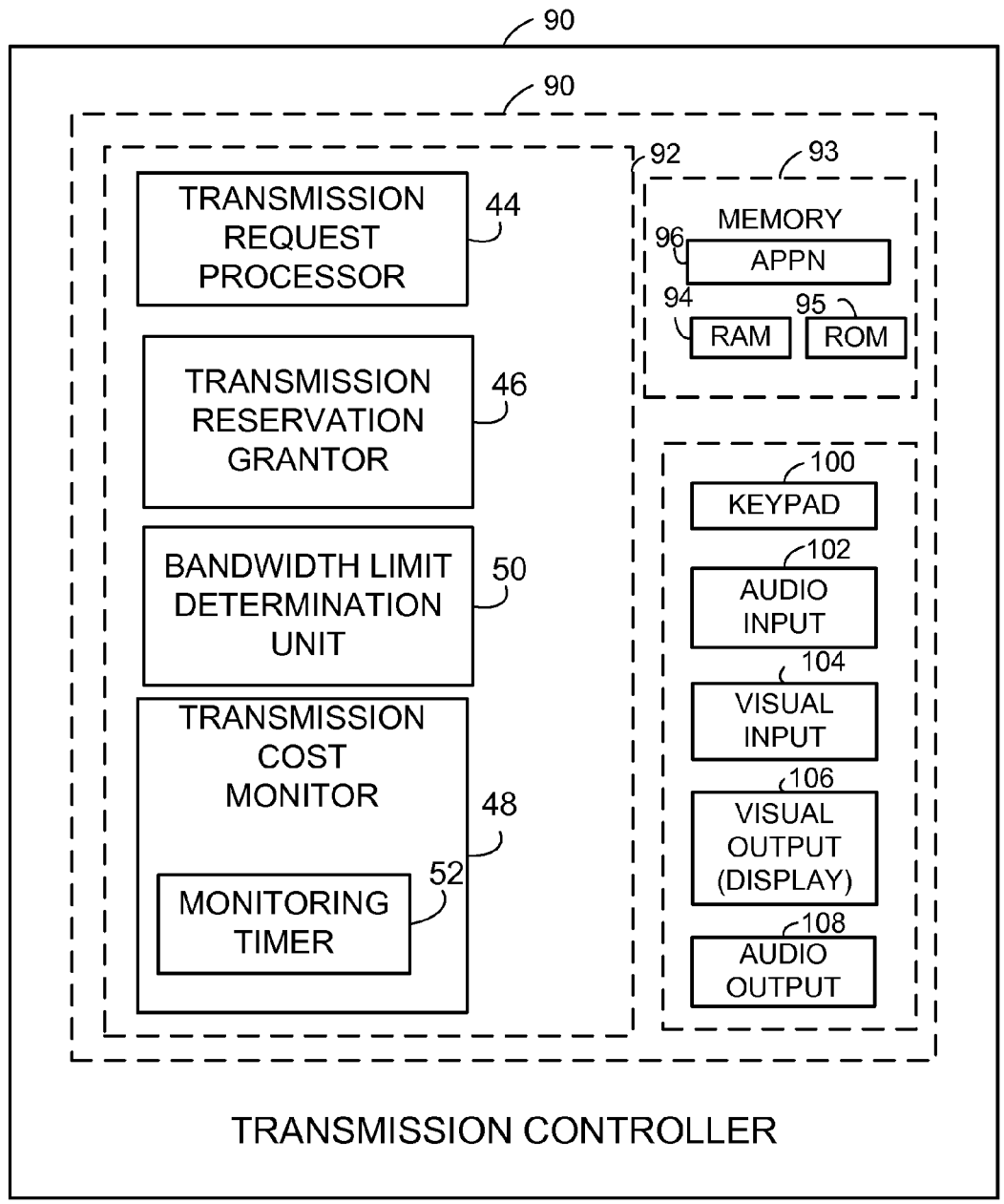
FIG. 8 is a schematic view showing in more detail various pertinent constituent units and functionalities of a transmission controller according to a non-limiting example embodiment which may be implemented on a platform such as electronic circuitry.

FIG. 8 illustrates more structural detail for certain example embodiments of charging system (e.g., the transmission controller 40). For example FIG. 8 illustrates that transmission controller 40 can be provided on a machine platform 90. The terminology "platform" is a way of describing how the functional units of transmission controller 40 can be implemented or realized by machine, e.g., electronic circuitry. One example platform 90 is a computer implementation wherein one or more of the framed elements, including transmission request processor 44, transmission reservation grantor 46, and transmission cost monitor 48, are realized by one or more processors which execute coded instructions in order to perform the various acts described herein.

In such a computer implementation the transmission controller 40 can comprise, in addition to a processor(s), memory section 93 (which in turn can comprise random access memory 94; read only memory 95; application memory 96 (which stores, e.g., coded instructions which can be executed by the processor to perform acts described herein); and any other memory such as cache memory, for example). Typically the transmission controller 40 also comprises other input/output units or functionalities, the representative input/output units for mobile station 30 being illustrated in FIG. 8 as keypad 100; audio input device (e.g. microphone) 102; visual input device (e.g., camera) 104; visual output device (e.g., visual display unit) 106; and audio output device (e.g., speaker) 108. Other types of input/output devices can also be connected to or comprise transmission controller 40. Various functional units of transmission controller 40 which are provided on the aforemention platform 90 are framed by broken lines in FIG. 8.

In the example of FIG. 8 the platform 90 has been illustrated as computer-implemented or computer-based. Another example platform suitable for transmission controller 40 is that of a hardware circuit, e.g., an application specific integrated circuit (ASIC) wherein circuit elements are structured and operated to perform the various acts described herein.

By having a centralized point that controls all scheduling of transmissions, the end user is not dependent on the client support for the scheduling of transmissions. Centralized scheduling of transmissions also makes it possible for the scheduling to start at any given point when the user-specified (e.g., user-configured) conditions are fulfilled. The clients in the mobile terminals are responsible for specifying what to transmission, where to store the information that is transmitted, and what to do when the transmission is finished. By controlling how much bandwidth each transmissions uses at any time, there is no impact on the clients. When a scheduled transmission is in "halted" state the bandwidth will be limited to a minimum, just enough to keep the transmission alive. When the conditions for starting the transmission are fulfilled, the bandwidth is increased according to the end user's subscription, and the transmission is set to state "ongoing". The conditions for the bandwidth control are evaluated on regular intervals.

The technology disclosed herein affords various advantages and benefits. One example advantage is that transmissions can be scheduled without significant impact on the client applications (e.g., client application software) executed on a wireless terminal. Another example advantage is that transmissions can be scheduled at or restricted to times when the price is acceptable, even in situations where the price changes dynamically. Yet another example advantage is that transmissions can be performed when it is most beneficial for either or both of the end user and the network.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of transmitting information to a wireless terminal comprising:
   receiving a request for a transmission reservation from a client application executed at a wireless terminal;
   using transmission rules stored for the wireless terminal to make a determination whether to grant a transmission reservation responsive to the request for the transmission reservation;
   after granting the request for the transmission reservation and during a transmission operation toward the wireless terminal associated with the transmission reservation, monitoring the transmission operation for compliance with the transmission rules;
   controlling bandwidth used by at least a portion of the remainder of the transmission operation in accordance with the monitoring,
   wherein the monitoring comprises determining whether a change in a per unit cost of the transmission requires at least a temporary limiting of the bandwidth used by the at least a portion of the remainder of the transmission operation.

2. The method of claim 1, wherein controlling the bandwidth used by at least the portion of the remainder of the transmission operation comprises selectively limiting the bandwidth used to a minimum bandwidth sufficient to keep the transmission reservation alive.

3. The method of claim 1, wherein controlling the bandwidth used by at least the portion of the remainder of the transmission operation comprises selectively limiting the bandwidth used for compliance with the transmission rules.

4. The method of claim 1, wherein timing of the monitoring occurs in accordance with monitoring timing logic.

5. The method of claim 4, further comprising configuring the monitoring timing logic so that the monitoring occurs at periodic intervals.

6. The method of claim 5, further comprising configuring the monitoring timing logic so that the monitoring is dependent upon at least one of network conditions and business conditions.

7. The method of claim 1, wherein the download transmission comprises a download of information to the wireless terminal.

8. The method of claim 1, wherein the download transmission comprises an upload of information to the wireless terminal.

9. A method of transmitting information to a wireless terminal comprising:
   receiving a request for a transmission reservation from a client application executed at a wireless terminal;
   using transmission rules stored for the wireless terminal to make a determination whether to grant a transmission reservation responsive to the request for the transmission reservation;
   after granting the request for the transmission reservation and during a transmission operation toward the wireless terminal associated with the transmission reservation, monitoring the transmission operation for compliance with the transmission rules; and
   controlling bandwidth used by at least a portion of the remainder of the transmission operation in accordance with the monitoring,
   wherein the transmission rules specify at least one of a per unit cost limit for the transmission operation and a maximum total transmission cost.

10. A transmission controller comprising:
    a transmission request processor configured to receive a request for a transmission reservation emanating from a client application executed at a wireless terminal;
    a transmission reservation grantor configured to use transmission rules previously stored for the wireless terminal to make a determination whether to grant a transmission reservation responsive to the request for the transmission reservation; and
    a transmission monitor configured
      to perform a monitoring of the transmission operation for compliance with the transmission rules after granting the request for the transmission reservation and during a remainder of the transmission operation toward the wireless terminal associated with the transmission reservation and
      to control bandwidth used by at least a portion of the remainder of the transmission operation in accordance with the monitoring,
    wherein the transmission monitor is further configured to determine whether a change in a per unit cost of the transmission requires at least a temporary limiting of the bandwidth used by the at least a portion of the remainder of the transmission operation.

11. The apparatus of claim 10, wherein the transmission monitor is configured to selectively limit the bandwidth used for compliance with the transmission rules.

12. The apparatus of claim 10, wherein the transmission monitor is configured to control the bandwidth used by at least the portion of the remainder of the transmission operation by selectively limiting the bandwidth used to a minimum bandwidth sufficient to keep the transmission reservation alive.

13. The apparatus of claim 10, further comprising a monitoring timer configured to cause the monitoring to occur at periodic intervals.

14. The apparatus of claim 10, further comprising a monitoring timer configured to cause the monitoring to be dependent upon at least one of network conditions and business conditions.

15. The apparatus of claim 10, wherein the transmission comprises a download of information to the wireless terminal.

16. The apparatus of claim 10, wherein the transmission comprises an upload of information from the wireless terminal.

17. A method of transmitting information to a wireless terminal comprising:
    receiving a request for a transmission reservation from a client application executed at a wireless terminal;
    using transmission rules previously stored for the wireless terminal to make a determination whether to grant a transmission reservation responsive to the request for the transmission reservation;
    after granting the request for the transmission reservation and during a transmission operation toward the wireless terminal associated with the transmission reservation, monitoring the transmission operation for compliance with the transmission rules;
    detecting, during the transmission operation, a change in a transmission cost parameter; and
    controlling bandwidth used by at least a portion of the remainder of the transmission operation in accordance with the monitoring, wherein the controlling bandwidth used comprises controlling the bandwidth used such that the portion of the remainder of the transmission operation is compliant with the transmission rules and the changed transmission cost parameter.

18. A transmission controller comprising:
a transmission request processor configured to receive a request for a transmission reservation emanating from a client application executed at a wireless terminal;
a transmission reservation grantor configured to use transmission rules previously stored for the wireless terminal to make a determination whether to grant a transmission reservation responsive to the request for the transmission reservation; and
a transmission monitor configured
   to perform a monitoring of the transmission operation for compliance with the transmission rules after granting the request for the transmission reservation and during a remainder of the transmission operation toward the wireless terminal associated with the transmission reservation, and
to control bandwidth used by at least a portion of the remainder of the transmission operation in accordance with the monitoring,
wherein the transmission rules specify at least one of a per unit cost limit for the transmission operation and a maximum total transmission cost.

* * * * *